March 7, 1933.   W. J. ANDRES ET AL   1,900,151

LEVER

Filed May 31, 1930

INVENTOR
WILLIAM J. ANDRES
CLARENCE E. WARD
BY  M. W. McConkey
ATTORNEY

Patented Mar. 7, 1933

1,900,151

UNITED STATES PATENT OFFICE

WILLIAM J. ANDRES AND CLARENCE E. WARD, OF SOUTH BEND, INDIANA, ASSIGNORS TO BENDIX AVIATION CORPORATION, OF SOUTH BEND, INDIANA, A CORPORATION OF DELAWARE

LEVER

Application filed May 31, 1930. Serial No. 458,484.

This invention relates to brakes and more particularly to operating levers therefor.

A major object of the invention is to provide a stamped steel operating lever.

An important object of the invention is to provide a stamped steel lever comprising two stampings welded or otherwise secured together that joint being of such a character that the finished product will not require burnishing.

A further object of the invention is to provide a stamped lever comprising two stampings welded together to provide a hollow lever possessing great strength and rigidity.

Still a further object of the invention is to provide a lever comprising two stampings fitted and welded together, one of the stampings extending over or fitted around the other to provide a smooth unbroken operating surface.

Other objects will appear from the following description taken in connection with the drawing, which forms a part of this specification, and in which.

Figure 1:
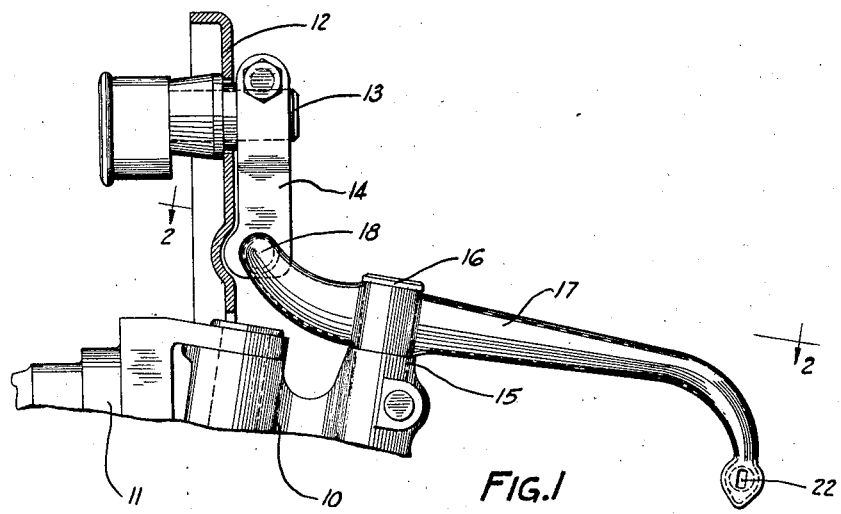
Figure 1 is a side elevation of the front axle of a motor vehicle having swivelled thereto a spindle supporting a brake and an operating lever for the brake.
Figure 2:
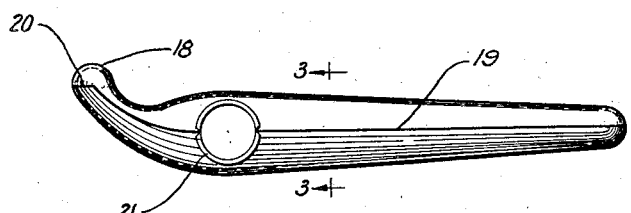
Figure 2 is a top plan view of the lever.
Figure 3:
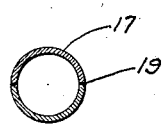
Figure 3 is a section substantially on line 3—3, Figure 2.

Referring to the drawing for more specific details of the invention, 10 represents the head of an axle having swivelled thereon a spindle 11 supporting a brake support 12. As shown, an operating shaft 13 is positioned for rotation in the backing plate or brake support and suitably secured to the operating shaft 13 is a lever or crank 14. Positioned on the axle adjacent the head is a boss 15 having mounted therein a pivot pin 16 and positioned for movement on the pivot pin 16 is an operating lever 17.

As shown, the lever has a rounded end portion 18 adaptable for engagement with the lever or crank 14 and the force applying end of the lever is extended downwardly substantially at right angles to the body portion thereof.

The lever 17 is constructed from two stampings welded together as at 19. These stampings are substantially alike and vary only in detail, as for instance, the end portion 18 on one of the stampings is formed to extend over or to fit around the other stamping as indicated at 20, so that a smooth unbroken engaging surface may be attained and yet great strength and rigidity maintained in the structure as a whole by reason of the wedging or bracing effect obtained in this particular structure. This is one of the most important factors of the invention, in that it provides a smooth surface for engaging the crank on the operating shaft and by reason of this smooth surface will not need finishing or burnishing during the course of manufacture.

It is to be observed that the stampings are so formed that when assembled, the fulcrum and the force applying end of the lever are materially strengthened by the flanges 21 and 22 engaging the pivot pin 16 and a reach rod, not shown, respectively.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A lever comprising two longitudinally extending generally channel-shaped parts permanently secured concave face to concave face, and each forming one side of the lever and said lever being formed with at least one of its ends out of line with the lever body and with one of said parts extending across the end of the other at said end of the lever to provide an unbroken ball shaped thrust surface.

2. A lever comprising two longitudinally extending generally channel-shaped parts secured face to face, and formed with a pair of registering semi-cylindrical openings formed respectively in each of said parts and jointly forming an opening for a fulcrum pivot, said parts each forming one side of the lever and one being longer than the other and overlapping the other to form a smooth unbroken ball shaped thrust portion at the end thereof.

In testimony whereof, we have hereunto signed our names.

WILLIAM J. ANDRES.
CLARENCE E. WARD.